United States Patent [19]

Decreamer

[11] Patent Number: 5,486,870
[45] Date of Patent: Jan. 23, 1996

[54] APPARATUS FOR THE DISPLAY OF PICTURES HAVING AN ASPECT RATIO 4/3 ON A DISPLAY HAVING AN ASPECT RATIO OF 16/9

[75] Inventor: Alain Decreamer, Garches, France

[73] Assignee: U.S. Philips Corporation, New York, N.Y.

[21] Appl. No.: 958,895

[22] Filed: Oct. 9, 1992

[30] Foreign Application Priority Data

Oct. 16, 1991 [FR] France .................................. 91 12765
Oct. 30, 1991 [FR] France .................................. 91 13402

[51] Int. Cl.⁶ .................................................... H04N 5/46
[52] U.S. Cl. .......................... 348/556; 348/581; 315/371
[58] Field of Search ..................... 358/140, 141, 358/11, 12, 168, 169, 180; 315/370, 371, 389, 403; 340/731; 348/556, 561, 581; H04N 5/46, 3/223

[56] References Cited

U.S. PATENT DOCUMENTS

| | | | |
|---|---|---|---|
| 2,510,670 | 6/1950 | Trott | 358/180 |
| 3,970,896 | 7/1976 | Marino | 315/371 |
| 4,230,974 | 10/1980 | Haak | 340/731 |
| 4,277,729 | 7/1981 | Rodgers | 315/398 |
| 4,547,708 | 10/1985 | Haferl | 315/371 |
| 4,763,194 | 8/1988 | Osman | 358/180 |
| 4,958,229 | 12/1990 | Guillon et al. | 358/180 |
| 4,984,081 | 1/1991 | Miyoshi et al. | 358/180 |
| 5,040,065 | 8/1991 | Vilard | 358/169 |
| 5,043,637 | 8/1991 | Gries | 315/371 |
| 5,084,765 | 1/1992 | Morita | 358/141 |
| 5,220,423 | 6/1993 | Chikuma | 358/141 |
| 5,249,049 | 9/1993 | Kranawetter et al. | 358/180 |

FOREIGN PATENT DOCUMENTS

| | | | |
|---|---|---|---|
| 0298362 | 6/1988 | European Pat. Off. | H04N 5/44 |
| 0375038 | 12/1989 | European Pat. Off. | H04N 5/57 |
| 1121648 | 1/1962 | Germany | H04N 3/22 |
| 70174 | 3/1990 | Japan | H04N 3/223 |
| 2135859 | 9/1984 | United Kingdom | H04N 3/223 |

OTHER PUBLICATIONS

Richard Strain, "The Shape of Screens to Come" Jul. 1988, p. 586.

Primary Examiner—James J. Groody
Assistant Examiner—Chris Grant
Attorney, Agent, or Firm—Michael E. Marion

[57] ABSTRACT

A picture display apparatus adapted to pictures having an aspect ratio 16/9, permitting the simultaneous control of the line length and the vertical spacing of the lines. For the reception of pictures having an aspect ratio 4/3, the two control circuits are coupled in such a manner that the length of the lines of the displayed picture is decreased (2, 20) when the vertical spacing of the lines is normal or that the length of the lines of the displayed picture is normal when the vertical spacing between the lines is increased (3, 6). In addition, the control circuits are a continuously variable type, and access of the user to the control circuits is effected by remote control.

2 Claims, 2 Drawing Sheets

APPARATUS FOR THE DISPLAY OF PICTURES HAVING AN ASPECT RATIO 4/3 ON A DISPLAY HAVING AN ASPECT RATIO OF 16/9

BACKGROUND OF THE INVENTION

The present invention relates to a picture display apparatus producing pictures by means of a sequence of lines, provided with user-accessible means for the simultaneous control of the line length and the vertical spacing between the lines.

Such an apparatus is, for example, a television receiver or a television monitor.

An apparatus of this type is disclosed in the U.S. Pat. No. 2,510,670 (Barnet S. Trott), which describes a television set having means for increasing the vertical amplitude and the horizontal amplitude together and in the same ratio so as to create a so-called "zoom" effect.

This apparatus does however not solve a different problem, namely the problem that: there are now television receivers on the market designed for receiving pictures whose width/height ratio, denoted aspect ratio, is 16/9. These pictures are transmitted more specifically by television satellites. In contrast thereto, the majority of television transmissions nowadays have an aspect ratio of 4/3.

When the reception of a picture having an aspect ratio of 4/3 on a television receiver having an aspect ratio of 16/9 is involved, it is sufficient to take measures to reestablish the correct aspect ratio of the picture and in addition the user wants to have the option to choose between the loss of a portion of the received picture or the fact that he cannot use the entire surface of the screen; this will be described in greater detail hereinafter with reference to the Figures. In high-gamma receivers, having an aspect ratio of 16/9 or an aspect ratio of 4/3, provided with picture stores allowing complex digital processing of the pictures, the pictures can be manipulated at will in order to solve all the above-mentioned problems.

SUMMARY OF THE INVENTION

The invention has for its object to provide generally a solution to this type of problems of standard television receivers without pictures stores or means for processing complex pictures.

To this effect, an apparatus according to the invention, is characterized in that, the apparatus being adapted to pictures having an aspect ratio of 4/3, in such a manner that the line length of the displayed picture is normal when the vertical spacing between the lines is increased, or that the line length of the displayed picture is decreased when the vertical spacing between the lines is normal, the said means for controlling the line length of the displayed pictured being dimensioned to render it possible to obtain at least two line length values which are in a mutual relationship of 1.33 and the said means for controlling the vertical spacing of the lines being dimensioned to obtain at least two corresponding line spacing values which are in a mutually inverse ratio. A "normal" spacing must here be understood to mean a spacing in which the amplitude of the lines which allows a coverage of the dimension of the screen with the lines such as they are defined at the transmission end.

During the television transmission of a "Cinemascope" movie picture in a foreign language and an original version, the sub-titles must be placed outside the actual picture (of the cinema film). In that case, if the highest possible picture is opted for, the sub-titles are hidden from view. If contrary thereto the entire 4/3 picture is chosen, it is much too small.

To avoid this drawback, an apparatus according to the invention, is characterized in that, the said control means are of a continuously variable type whose variation control is accessible to the user of the television set.

In this manner a picture of an intermediate dimension can be obtained, which renders the sub-titles visible but is nevertheless larger than a complete picture.

To increase the ease of handling by the user, an apparatus according to the invention is advantageously provided with means to allow access of the user to the said control means via remote control.

In an advantageous embodiment, the apparatus, provided with a cathoderay tube, includes a line scanning circuit of the diode modulator type, having a parabola generator for an east-west correction, and means for acting on the average d.c voltage of the parabolas in the parabola generator circuit, for the control of the horizontal amplitude.

The apparatus, which forms pictures with the aid of a cathode-ray tube, using a field frequency sawtooth current generator which comprises an amplifier for injecting said sawtooth current into a beam deflection coil, a negative feedback being applied to this amplifier, is advantageously provided with means for having the raising edge of this negative feedback vary so as to adjust the spacing between the lines, and it furthermore includes means for cutting-off those portions of the vertical scanning sawtooth that would produce picture elements beyond the screen.

As the apparatus is provided with a microprocessor for managing the control of the line and field scans, and the two limits desired for the amplitudes being adjusted accurately by means of the microprocessor, the said user-accessible control means have a setting range extending between these two limits.

In addition, the apparatus having a video circuit which produces a voltage drop for suppressing the luminance during the line retraces, it is advantageously provided with means for having the said drop start from the instant at which a video information is no longer present at the end of a line, and to have this drop continue as least until a video information is present again at the start of the next line.

BRIEF DESCRIPTION OF THE DRAWINGS

The following description which is given with reference to the accompanying drawings of non-limitative examples, will make it better understood how the invention can be put into effect.

DETAILED DESCRIPTION OF PREFERRED EMBODIMENTS OF THE INVENTION

The following description relates to the case in which a picture having an aspect ratio of 4/3 is displayed on a receiver set having a 16/9 screen. The basic principle of the invention is not so suitable for the opposite case, i.e. the case in which a picture received with an aspect ratio 16/9 is received on a receiver having a size 4/3, as then the line amplitude must be increased to beyond the normal, which cannot easily be done. One of the merits of the invention is that this problem does not occur for the case of a picture received with an aspect ratio 4/3 for display on a 16/9 receiver set.

Figure 1:
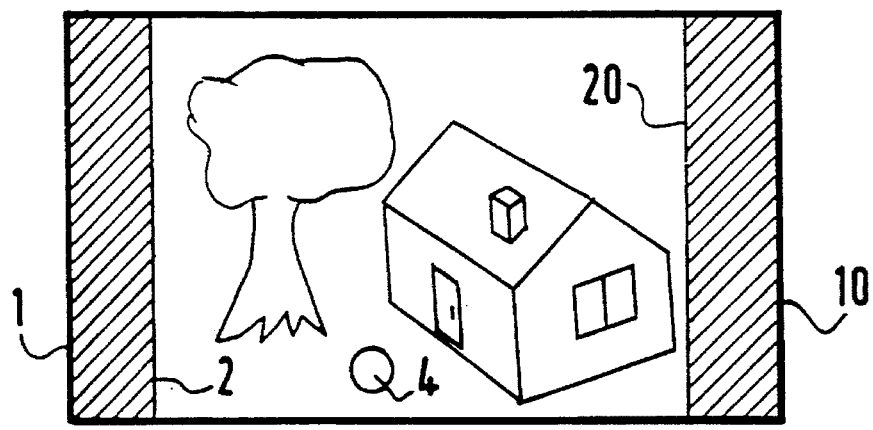
FIG. 1 shows the screen of an apparatus which has an aspect ratio of 16/9 adapted at the receiving end to display a 4/3 picture, in a first situation in which the entire reproduction of the 4/3 picture is desired.

In FIG. 1, reference numerals 1 and 10 denote the lateral edges of the screen of a receiver for 16/9 pictures. The reference numerals 2 and 20 denote the lateral edges of a picture having an aspect ratio 4/3, such as they can be shown on the screen when one wants to observe it in its totality. A portion of the screen, indicated by hatched portions, is not used.

Figure 2:
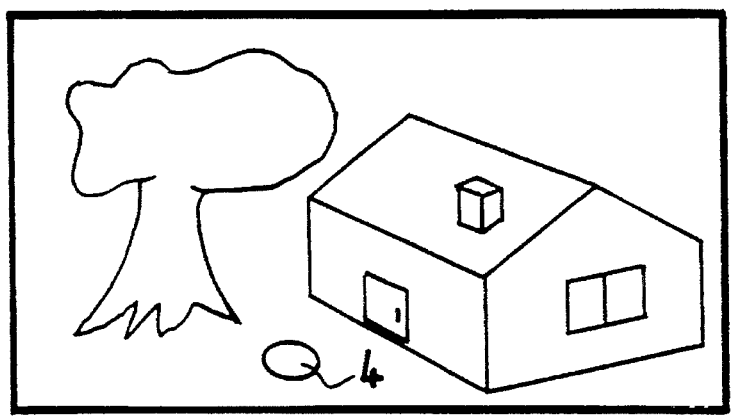
FIG. 2 shows the screen of an apparatus which has an aspect ratio of 16/9 which without specific precautions receives a picture transmitted in 4/3.

In FIG. 2 the same picture is represented as it would be seen if a 16/9 receiver were used without special precautions while tuning its tuner to a PAL or SECAM transmission with a picture having an aspect ratio 4/3. The useful duration of a PAL or a SECAM line and the field period are the same as those used for the line and the field having an aspect ratio 16/9, and the picture shown thus occupies the entire screen. It should be noted, particularly when comparing the ball 4 to the ball in FIG. 1, that the picture is deformed due to horizontal extension.

Figure 3:
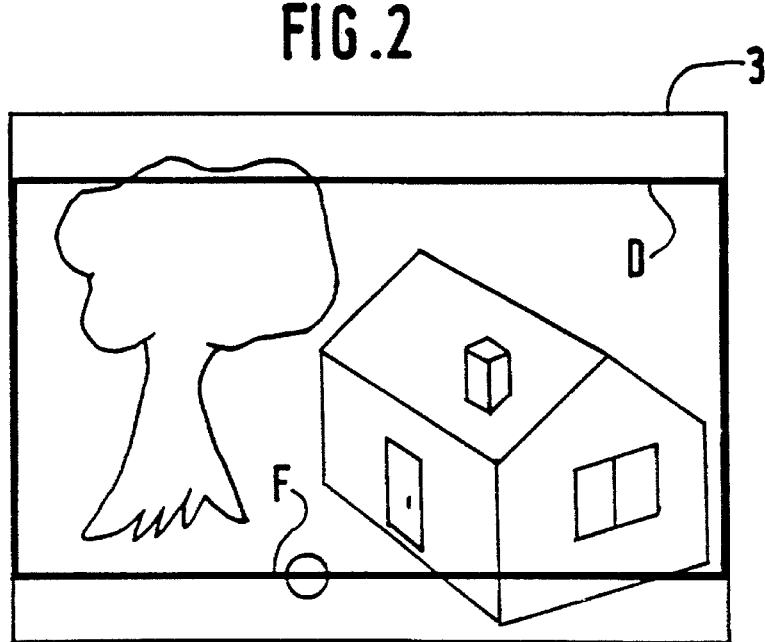
FIG. 3 shows the screen of an apparatus which has an aspect ratio of 16/9 adapted to receive a 4/3 picture, for a further situation in which a largest possible reproduction of the objects shown is desired.

In FIG. 3, the references D and F denote the respective top and bottom limits of the screen for receiving 16/9 pictures. A picture received with an aspect ratio 4/3 is represented thus when one wants to have the largest possible picture. Reference numerals 3 and 6 denote the top and bottom limits of the 4/3 pictures, which are then beyond the screen. The lateral edges of the picture are in alignment with those of the screen but the picture portions between the limits 3 and D on the one hand and between the limits F and 6 on the other hand are lost.

When an apparatus having a picture store is used, the situation shown in FIG. 1 is obtained by storing the received picture in such a store, without displaying it, displaying it thereafter by reading the store again, starting the reading operation at each line in the store with a delay relative to the start of the line scan on the screen, so that the reproduced picture only starts at 2, and at such a rate that the end of reading the line occurs at 20 before the right-hand edge of the screen is reached.

The situation shown in FIG. 3 is obtained for this same apparatus by starting the store reading operation from an address corresponding to the line D of the received picture, and by ending at the line corresponding to the line F of the received picture. Measures must possibly be taken to generate additional lines so as to have the disposal of a number of lines equal to the number of lines of the screen between the lines D and F.

In accordance with the invention, the situation shown in FIG. 1 is obtained by reducing the amplitude of the horizontal scanning of the cathode-ray tube, while the amplitude of the vertical deflection is kept normal. The situation shown in FIG. 3 is obtained by increasing the amplitude of the vertical scan of the cathode-ray tube, that is to say the spacing between the lines, whereas the amplitude of the horizontal deflection is kept normal.

The horizontal amplitude and the vertical amplitude are denoted by DH and AV, respectively, and DH and AV are assumed to have a value 1 for the normal scanning of the 16/9 screen.

The control means for controlling the vertical spacing between the lines and the lengths of the lines of the reproduced picture are both dimensioned such that two spacing values AV of the lines are obtained, namely 1.333 and 1, which are in a mutual relationship equal to the ratio between the said two aspect ratios, and two line length values DH, namely 1 and 0.75, which are in the same mutual ratio (1 divided by 0.75 is 1.333). Actually, the ratio between the aspect ratios is 16/9 divided by 4/3, i.e. a ratio of 4/3 or 1.333.

These two control means are coupled to provide that they act in unison; so for the case shown in FIG. 1 it is obtained that: DH=0.75 and AV=1, and for the case shown in FIG. 3 the two values of DH and AV are modified together, resulting in: DH=1 and AV=1.333.

The user of the apparatus has direct access to the control means, and he himself can therefore chose the situation he wants.

The control means are moreover of a continuously variable type, so that all the intermediate situations between the situations shown in FIG. 1 and FIG. 3 can also be obtained. Access to such a control is preferably effected by means of the remote control of the apparatus, which has one or a plurality of push buttons for that purpose.

Figures 4A, 4B:
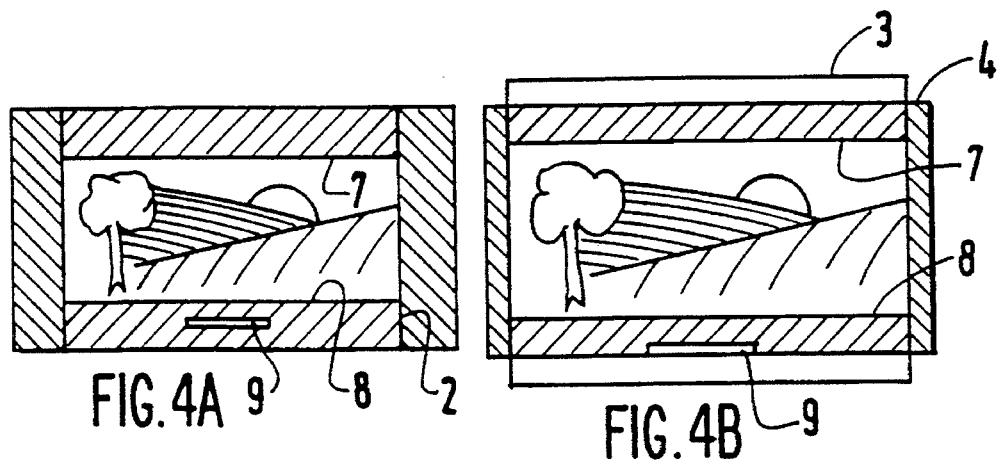
FIGS. 4A and B show a specific situation in which a movie film in "Cinemascope" aspect ratio is transmitted in accordance with the 4/3 aspect ratio, and received on a 16/9 receiver.

FIG. 4 shows the advantage of such a feature: FIG. 4A illustrates the same situation as in FIG. 1, for the case in which the current transmission is a "Cinemascope" film. The right-hand edge of the picture received with an aspect ratio of 4/3 is always indicated by reference numeral 2, but the top and bottom edges of the useful picture, that of the film, denoted by reference numerals 7 and 8, leave a portion of the screen unused above and below the picture. A zone 9 is provided for sub-titles, if any.

It will be obvious that in the situation of FIG. 3, the sub-titles would be at the exterior of the screen. The situation of FIG. 4B which corresponds to an intermediate dimension of the line length and the line spacing render it possible to obtain a larger picture than shown in FIG. 4A while maintaining the zone 9 for visible sub-titles.

Figure 5:
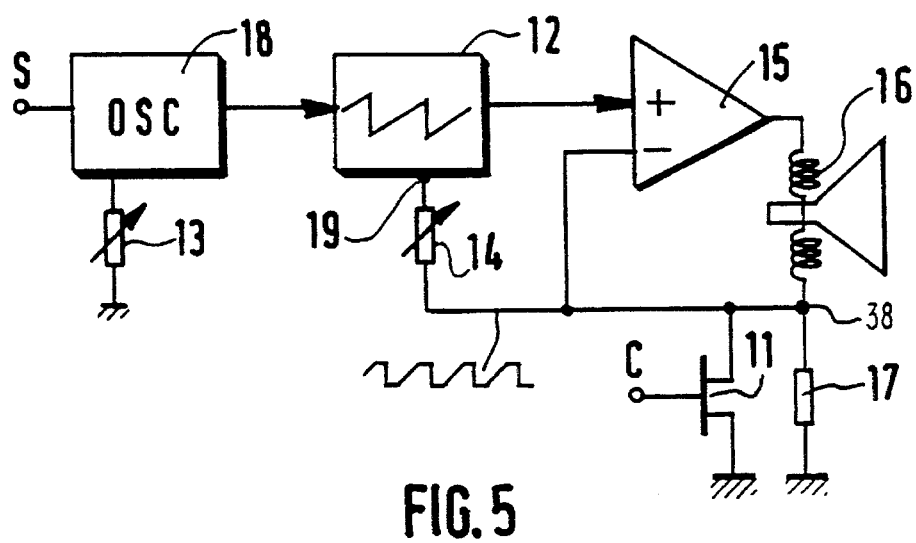
FIG. 5 is a circuit diagram of a known vertical scanning circuit to which a means is added for controlling the vertical spacing between the lines and for limiting the total vertical amplitude.

The vertical scanning stage, whose block circuit diagram is shown in FIG. 5, comprises an oscillator 18 which is synchronized by a synchronizing signal applied to an input S, and whose free oscillation frequency is controlled by a variable resistor 13, followed by a ramp generator 12 which supplies sawtooth signals to a "+" input of an output amplifier 15, which amplifier finally applies a deflection current to a field deflection coil 16. This coil is connected to ground via a current measuring resistor 17 and the signal taken from the point 38 is applied to a "−" input of the amplifier 15, to create a negative feedback, as well as to an input 19 of the ramp generator 12, via a variable resistor 14, in order to create there an adjustable nonlinearity in the shape of an "S" required by the system. All this is known to a person skilled in the art.

In an apparatus in accordance with the invention, a field-effect transistor (FET) 11 is incorporated which has its drain-source space connected in parallel with the resistor 17. This transistor is controlled by a control voltage C applied to its grid. As is known, the drain-source space of a field-effect transistor behaves as a controllable resistance and this resistance is arranged in parallel with the resistor 17: thus the voltage generated at the point 18 by a given current in the deflection coil is variable as a function of the control voltage C, and consequently the negative feedback is modified which acts on the amplitude of the deflection current. A low-power FET transistor is sufficient, for example the transistor marketed under the type designation "Jedec" BF256.

The supply voltage of the circuit of FIG. 5 may be decreased to the minimum just required to allow the entire vertical scanning of the screen. Thus those portions of the vertical scanning sawtooth which might result in picture elements outside the screen at certain settings of the gain of the amplifier are cut-off, the signal then having the shape shown in FIG. 5 below the resistor 14.

The apparatus is provided in a manner known per se with a line scanning circuit of the "diode modulator" type. Such a circuit is designed to enable a dynamic horizontal amplitude control, that is to say an amplitude which varies during the same field, without affecting the voltages generated from the line scanning circuit onwards. In this manner one can have the amplitude vary in a parabolic manner during the duration of a field to apply a known correction, the so-called east-west correction. The known "diode modulator" circuits are therefore provided with a connection terminal for an amplitude control signal.

Figure 6:
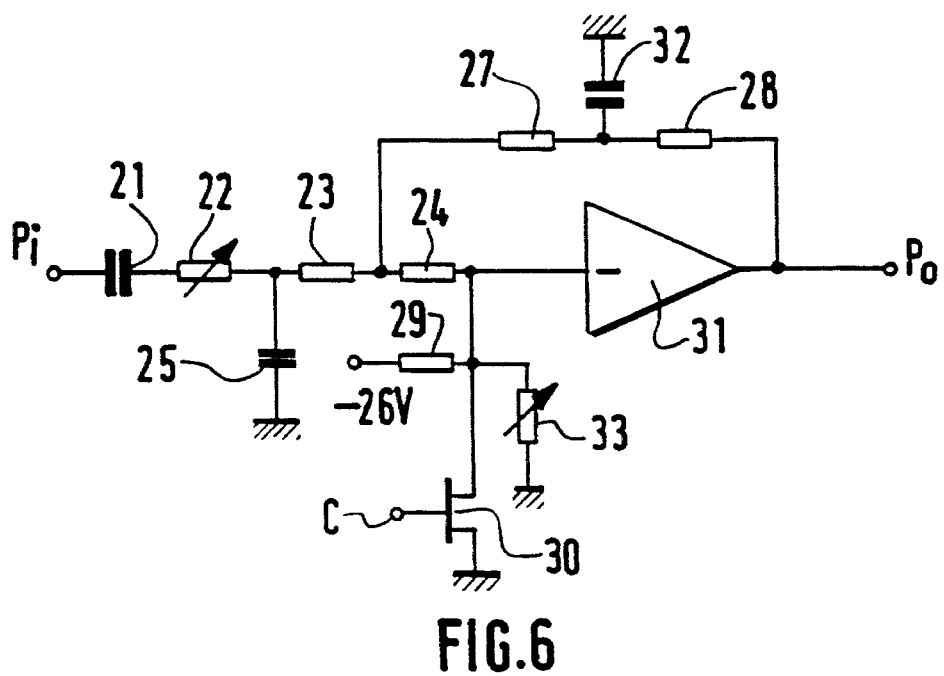
FIG. 6 is a circuit diagram of a portion of a circuit for generating amplitude control voltages intended for a known diode modulator, to which diagram a line amplitude control means is added.

The voltage intended to be applied to this control terminal for thus having the amplitude vary, is generated by a circuit of which an embodiment is shown in FIG. 6. Applied to an input Pi is a signal in the shape of a parabola which is generated in known manner. This signal is transmitted via a capacitor 21 and three series-arranged resistors 22, 23, 24 to the input of an amplifier 31, whose output terminal Po is connected to the said connection terminal for a control signal for the amplitude of the diode modulator (not shown). The resistor 22 is adjustable to allow the control of the amplitude of the parabolas. A capacitor 25 connects the junction point of the resistors 22 and 23 to ground. A negative feedback is obtained by means of the two resistors 27 and 28 which are arranged in series between the output of the amplifier (which produces a 180° phase shift of the signal) and its input. The junction point of these two resistors is connected to ground via a capacitor 32 so as to provide that the negative feedback only occurs for direct current.

The input of the amplifier is further connected to the intermediate tap of a voltage divider bridge which is formed from two resistors 29 and 33 one of which is variable, and is placed between ground and a "−26 V" terminal connected to a voltage source, not shown. The variable resistor has for its object to allow a control of the d.c. level of the output signal of the amplifier, since it is one of the elements which define the value of the negative feedback. All this is known to a person skilled in the art.

An apparatus in accordance with the invention, is provided with a field-effect transistor (FET) 30 which has its drain-source space connected in parallel with the resistor 33. This transistor performs the function of a variable resistance and its grid is controlled by the control voltage C.

The apparatus is provided with a micro-processor which more specifically manages the commands given by the user via his remote control unit. The control voltage C, which is common to the two configurations of FIGS. 5 and 6, is produced with the aid of this micro-processor in response to a remote control command. This may, for example, be obtained by programming the micro-processor such that it generates a signal whose form factor varies as a function of the desired aspect ratio. This signal, which is transmitted via a capacitor, thereafter aligned with ground so as to fix its highest portion at zero volt, and finally integrated, thus supplies a variable negative d.c. voltage suitable to control the grid of the field-effect transistors 11 and 30.

The micro-processor is then also used to manage the control of the line and field scanning amplitudes. During the manufacture of the apparatus, the control procedure includes a stage in which the micro-processor stores the values, which slightly differ from apparatus to apparatus, of the form factor to be generated to obtain the two desired limits for the amplitudes. These amplitudes can thus be accurately controlled by the micro-processor (by means of the relevant stored values). From there the control range of the said user-accessible control means extends between the said two limits.

Different manners of realizing the control are conceivable. For example, instead of generating the voltage by integration of a variable form signal a digital-to-analog converter might be used. For the case of the circuit shown in FIG. 6, one might alternatively use, instead of a FET transistor, a digitally programmable source as the "−26 V" voltage source which might be adjusted in an adequate range around −26 volts.

In prior art television sets which do not include picture processing means based on picture stores, scanning of the screen is synchronized with the sending of video information components by the transmitter, and the line scan is controlled with such an amplitude that the reproduced lines slightly overflow to beyond the screen, more specifically for rendering a "sparking" effect in the region of the vertical edges of the picture invisible by pushing them from the screen, which effect is due to the fact that the receiver tries to identify video signals while they are no longer present in the received signal. When the picture is displayed as shown in FIG. 1, the vertical edges of the picture and the fault are visible. When a television set is used having picture processing means based on picture stores, there is no such problem as only the useful picture elements entered into the store are reproduced. In an apparatus in accordance with the invention, provided with a video circuit supplying a voltage drop for blanking the luminance during the line retraces, this fault is obviated because the apparatus is provided with means for having the said drop start as soon as a video information is no longer present at the end of a line, and for having said drop continue until at least a video information is again present at the beginning of the next line. When the apparatus includes a clock circuit comprising a master clock having a frequency which is a multiple of the line frequency and the frequency of the chrominance subcarrier, which circuit supplies different synchronizing peaks by counting clock periods, these means can easily be realized by marking the suitable counting instants of the clock circuit.

Moreover, account must be taken of the fact that when the picture differs from that shown in FIG. 2, its surface is different while its scanning period is the same, and consequently the brightness will be different when no special precautions are taken. For the case shown in FIG. 1, the picture is smaller and therefore brighter, while for the case illustrated in FIG. 3, the opposite occurs.

In order to correct these brightness deviations, the variable control signal of the aspect ratio is also utilized to act on the video amplifying circuit, so as to change the amplitude of the signal applied to the cathode-ray tube.

The video circuits may, for example, be of the type described in the patent application EP-A-0 375 038 filed by Applicants, to which reference can be had for further details. These video circuits ensure, inter alia, a preamplification of the video signals with a controllable gain by means of a variable control voltage, with the object of changing the contrast of the picture, the television set being on the other hand provided with a control circuit for the contrast which comprises a comparison device for comparing the peak value of the video signal to a reference threshold, the signal obtained when this threshold is exceeded being applied, after integration, to a manually operated contrast control device supplying a further control signal, depending on the user, and which is also utilized for the control of the controllable preamplifying gain. The nominal gain of the amplification of the signal being sufficiently high to provide, for the majority of the pictures received, that the peak values of the video signal (of each of the video signals R, G, B) reach the said reference value, this reference value is adjustable as a function of the contrast command issued by the user, which variation of the threshold ultimately constitutes the manual control device of the contrast.

With such a circuit, the correction as a function of the aspect ratio of the picture is applied such that the reference threshold is changed. A person skilled in the art can easily conceive means for adding, with the desired weighting, the variable aspect ratio control signal to the user-dependent contrast control signal.

I claim:

1. A picture display apparatus for displaying an input video picture, the apparatus comprising:

a video display means having a first aspect ratio $R_1$, where aspect ratio is the ratio of width to height; and displaying means coupled to said video display means, said displaying means including:

horizontal and vertical scanning circuits for displaying an input video picture in whole or in part as a displayed video picture on the video display means, the displayed video picture having a plurality of lines, each having a line length L, and being mutually separated from one another vertically by a vertical spacing W, wherein L has a value $L_0$ and W has a value $W_0$ when the input video picture has the first aspect ratio $R_1$, and is normally displayed on the video display means;

horizontal scanning control means of a continuously variable type coupled to said horizontal scanning circuit and operating directly on said horizontal scanning circuit; and vertical scanning control means of a continuously variable type coupled to said vertical scanning circuit and operating directly on said vertical scanning circuit, wherein said horizontal scanning control means and said vertical scanning control means are coupled, and said horizontal and vertical scanning control means at least enable a user, at least in the situation that the input video picture has a second aspect ratio $R_2$, which is smaller than the first aspect ratio $R_1$, to continuously select said line length L and said vertical spacing W, while maintaining a relation between the line length L and the vertical spacing W in such a way that:

$$\frac{L/W}{L_0/W_0} = \frac{R_2}{R_1},$$

2. The picture display apparatus as claimed in claim 1, wherein the first aspect ratio $R_1$ equals 16/9 and the second aspect ratio $R_2$ equals 4/3.

* * * * *